Figure 1:
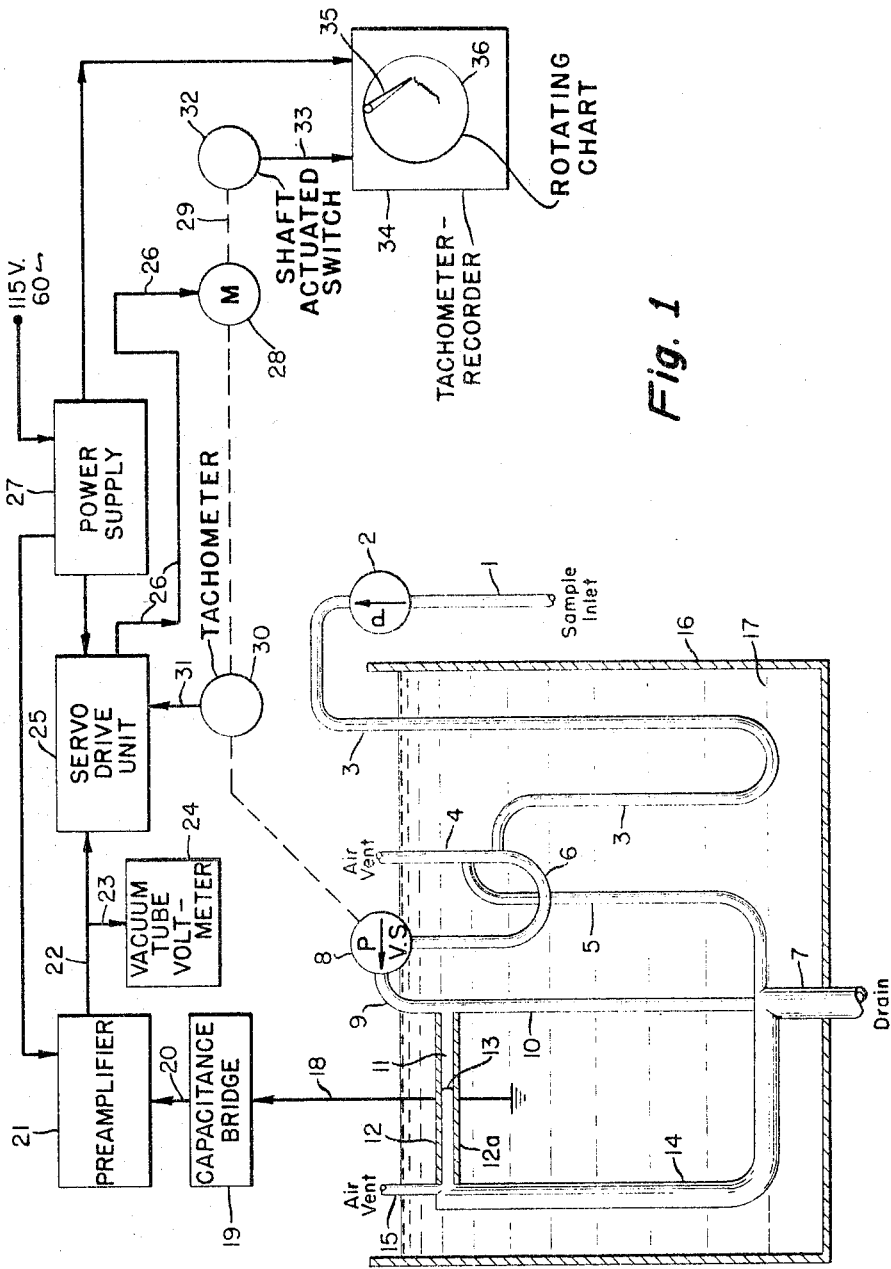

INVENTORS:
Lowell Glenn Whitesell
Lloyd G. Lewis

INVENTORS:
Lowell Glenn Whitesell
Lloyd G. Lewis

United States Patent Office 3,283,246
Patented Nov. 1, 1966

3,283,246
TACHOMETER HAVING AN OUTPUT INVERSELY PROPORTIONAL TO THE ROTATIONAL SPEED BEING MEASURED
Lloyd G. Lewis, La Grange, Ill., and Lowell Glenn Whitesell, Hammond, Ind., assignors to Standard Oil Company, Chicago, Ill., a corporation of Indiana
Original application Oct. 1, 1959, Ser. No. 843,772. Divided and this application June 29, 1962, Ser. No. 217,774
2 Claims. (Cl. 324—70)

This is a division of application S.N. 843,772, which was filed October 1, 1959 and which has since issued as U.S. Patent 3,137,161.

This invention relates to testing apparatus and more particularly pertains to an inverse-relation tachometer which is used in a system for measuring the kinematic viscosity of liquids, whether as laboratory samples or as a continuously sampled flowing stream.

In many petroleum refinery and petrochemical operations there are instances in which it is necessary to determine viscosity as a control on product quality. In some instances, viscosity is best expressed in abosolute units of poise. However, in specifying the viscosity ranges of lubricating oils, and in determining lubricating oil viscosity index, it is essential that kinematic viscosity in stokes be obtained. Kinematic viscosity is mathematically expressed as viscosity in absolute units divided by the mass density of the fluid. While many excellent laboratory and plant devices have been developed for determining absolute viscosity, the problem of obtaining the kinematic viscosity in an error-free system has remained a troublesome one.

When lubricating oils are to be blended to a viscosity specification, the need for rapid and accurate viscosity determinations becomes even more critical. In a typical blending operation, perhaps six or seven stocks of widely varying physical properties must be blended to obtain the final on-specification product. Blending times in modern refineries are quite short; half a tank car of motor oil is usually blended in about 15 minutes. A single run of a multistock blending machine seldom exceeds 30 minutes running time, and the majority of runs are 20 minutes or less. Keeping in mind that most viscosimeters heretofore available read in absolute viscosity units, yet the product must be blended to a kinematic viscosity specification, it is apparent that the laboratory determinations of absolute viscosity and density, coupled by appropriate computation to convert to kinematic units, would in many instances be longer than the total run of each blend. Obviously, it would be impossible for a laboratory to maintain continuous control of a blending operation which can be completed in the time required to check one viscosity and one density in the laboratory.

Our invention is a tachometer in which the output signal is inversely proportional to the rotational speed of the shaft, the speed of which is being measured. The rotating shaft actuates a double-throw contact, the amount of actuation being dependent upon the frequency of rotation of the shaft. The double-throw contact is connected to a capacitor. A charge from a direct current voltage source is stored in the capacitor; and when the rotating shaft causes the associated contact to be reversed, the capacitor is then discharged into a filter circuit which comprises a resistance and a capacitance in parallel. The voltage across the filter circuit is compared with a voltage of constant magnitude. The resultant difference voltage is the output of the tachometer and is inversely proportional to the speed of the rotating shaft. This difference voltage actuates a servo system to adjust the potentiometer supplying the charge to the capacitor and to move a suitable indicating means.

The rotating shaft could sequentially actuate a set of a plurality of double-throw contacts, each double-throw contact having an associated capacitor. The tachometer would be effective whether one double-throw contact and its associated capacitor or a set of double-throw contacts and associated capacitors were used.

Figure 2:
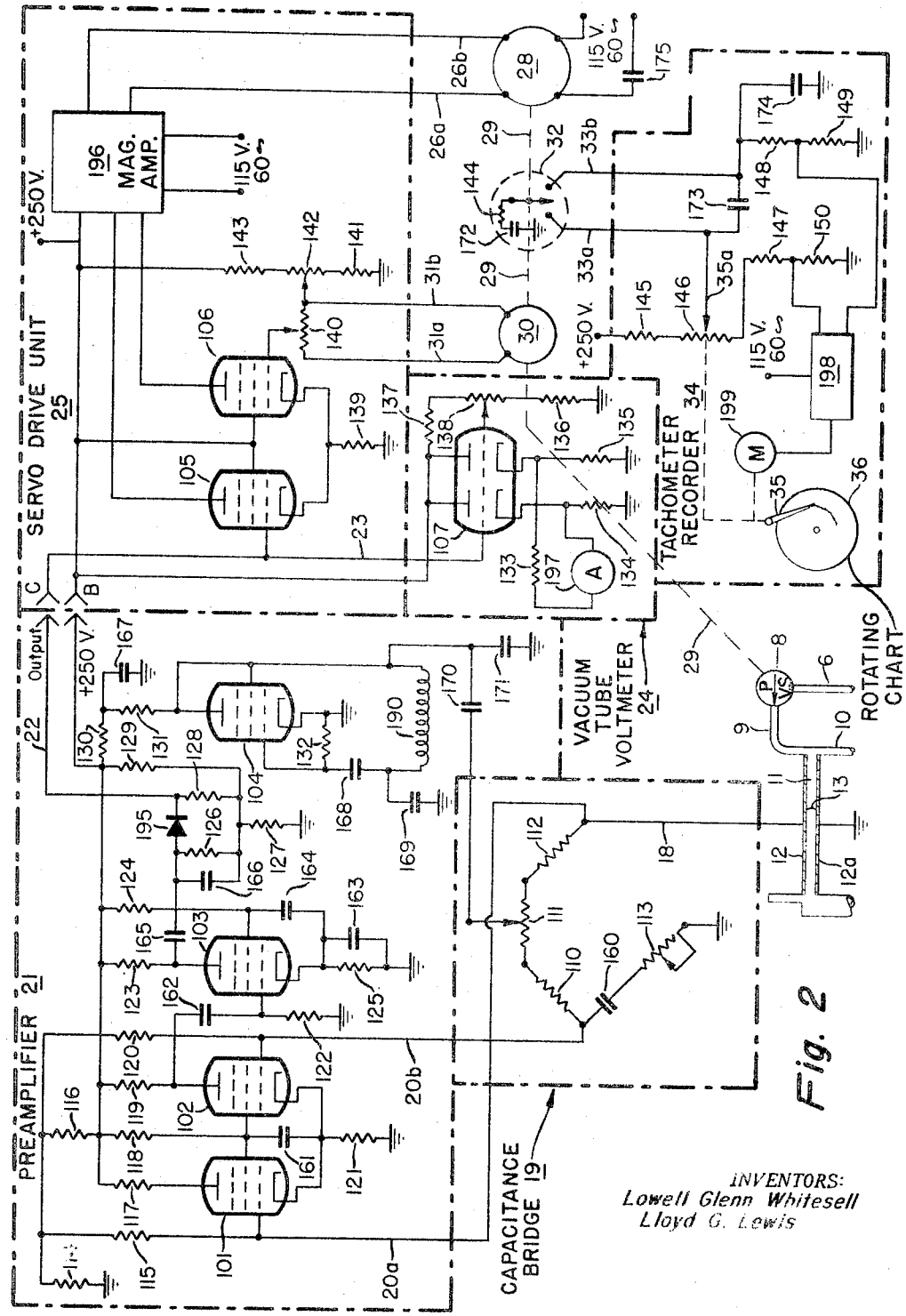

Details of the invention will be apparent to those skilled in the art as the description herein proceeds with reference to the accompanying drawings wherein:

FIGURE 1 is a simplified diagram which shows how our present invention would be connected to the kinematic viscometer disclosed in the allowed application, S.N. 843,772, now U.S. Patent 3,137,161; and FIGURE 2 portrays in detail an electrical circuit suitable for application in accordance with the invention. The arrangement and numbering employed throughout FIGURE 2 parallel those shown in FIGURE 1.

The apparatus in FIGURE 1, comprises a flow restrictive conduit such as capillary tube 10, a means for determining the hydrostatic head of liquid in tube 10 such as manometer 11, a variable speed pump 8 which is driven by servo motor 28, and appropriate electrical circuitry for varying the speed of pump 8 and motor 28 so as to maintain a constant hydrostatic head as indicated by manometer 11. Sample pumping rate may be determined by a shaft actuated switch 32 coupled to servo motor 28, which connects with the tachometer-recorder 34.

Sample liquid such as lubricating oil or other material for which the viscosity is to be measured is introduced via sample inlet line 1, which connects either to a flowing stream of liquid or to a sample vessel. An excess of sample is pumped via feed pump 2; this pump rate is in excess of that required to send the flow through flow restrictive conduit or tube 10.

Sample liquid is pumped from feed pump 2 into a thermostatically controlled constant temperature bath 16. This bath 16 is filled with temperature-conducting liquid 17 such as a mineral or silicone heating oil which is stable at operating temperatures. Appropriate heating and/or cooling coils (not shown) are provided in bath 16, as is one or more thermostatic switches for the purpose of maintaining both tube 10 and the sample liquid at constant test temperature. While the precision of viscosity measurement is largely affected by the accuracy at which the temperature is regulated, for most purposes a bath 16 temperature which is controlled to within plus or minus 0.1° F. is adequate.

Sample liquid from feed pump 2 is pumped in heat exchange relationship with liquid 17 and bath 16 via heat exchanger coils 3 which are immersed in liquid 17. These coils 3 are of sufficient length and surface area as to assure the maintenance of substantially constant temperature of the sample liquid.

From coil 3, the sample flows to a vented overflow system where entrained air or other gases is vented to the atmosphere and from which a gas-free sample is taken for ultimate transfer to tube 10. This particular system includes a vented conduit 4 which releases to atmosphere, a bottom drawoff conduit 6 which leads to the variable speed servo pump 8, and an overflow conduit 5 which is disposed above conduit 6 and which releases excess sample liquid, over and above that necessary for transferring to tube 10, to drain 7. From drain 7, the liquid may either be returned to the main stream of liquid, or may be sent to a suitable sump.

That portion of sample liquid which is to be pumped to tube 10 is withdrawn via conduit 6 and taken to the suction of servo pump 8, which discharges through line 9 into tube 10. Line 9 remains full of liquid at all times. Servo pump 8 is a precision positive-displacement pump, suitably of the gear type, which meters an exact quantity of liquid dependent solely on pump speed and independent of liquid viscosity. Servo pump 8 is powered by servo motor 28 via shaft 29 or other equivalent coupling means. Shaft 29 may also be connected to a direct current (D.C.) tachometer 30 which is connected in a servo motor 28 feedback control system, and to the shaft actuated switch 32 which connects via line 33 to the tachometer-recorder 34. Tachometer-recorder 34 provides the indication which is a measure of the kinematic viscosity of the sample liquid.

It is exceedingly important in the inventive system that the hydrostatic head of liquid in flow restrictive conduit or tube 10 be maintained at a substantially constant value. Many differential pressure devices which are suitable for this purpose are known. However, it has been found that exceptional precision and accuracy may be obtained by means of a vented horizontal manometer 11 system including parallel plate condensers 12 and 12a. This vented manometer system connects via conduit 14 to both the top and bottom portion of tube 10 and is vented to the atmosphere via vent 15. At the top of this system extends a substantially horizontal manometer tube 11, in which is present a meniscus 13 which assumes a position dependent on the integral of the differential pressure across tube 10. This integral feature establishes a reset action in the servo pump 8 speed control system for improved accuracy.

The position of meniscus 13 is located by means of parallel plate condenser made up of plates 12 and 12a, which is connected via line 18 into a capacitance bridge circuit 19. If the fluid whose viscosity is being measured has a dielectric constant which is substantially different from that of air, the effective capacitance of the parallel plate condenser will vary depending on what proportion of the volume between plates 12 and 12a is occupied by liquid. Thus, by suitable measurement of this capacitance by means of capacitance bridge circuit 19 the position of meniscus 13 in manometer 11 may be accurately indicated electrically.

Sample liquid which is transferred into tube 10 by means of servo pump 8 and conduit 9 flows through the tube at a rate which is inversely proportional to the kinematic viscosity of the sample fluid.

The signal from condenser 12 and 12a is sensed by capacitance bridge 19 which is energized by a radio frequency voltage supplied from an electronic oscillator circuit which is a part of preamplifier circuit 21. Both capacitance and dissipation factor balance adjustments may be included in capacitance bridge circuit 19, which bridge circuit is normally balanced for the condition of a half-filled manometer 11.

The signal from unbalanced capacitance bridge circuit 19 is electronically amplified in preamplifier 21 and is converted from a radio frequency signal to direct current by a suitable rectifier such as a crystal diode.

The D.C. signal from preamplifier 21 is then fed via line 22 to servo drive unit 25. This unit may be any of a variety of circuits adapted for regulating the speed or velocity of a servo motor. Magnetic amplifiers, saturable reactors, or vacuum tube servo drive units may be employed, although it has been found that extreme ruggedness and simplicity are achieved with the use of a magnetic amplifier in this service.

A valuable adjunct to the present circuit comprises voltmeter 24 of the vacuum tube type, connected via line 23 into the electrical circuit. Vacuum tube voltmeter 24 provides a dial reading which is linear with the position of meniscus 13 in manometer 11. This is useful in adjusting the instrument for proper operation and detecting malfunction.

Servo drive unit 25 is connected into servo motor 28 via line 26. Whenever the position of meniscus 13 moves as to indicate a reduced effective hydrostatic head in tube 10, the circuit of capacitance bridge 19, preamplifier 21, and servo drive unit 25 increases the speed of servo motor 28 to pump more liquid through servo pump 8 and thereby restore zero $\Delta p$ across tube 10. Conversely, a meniscus position in manometer 11 which is higher than normal operates to reduce the speed of servo motor 28 and correspondingly reduce the pumping rate of sample liquid into tube 10.

The various circuit components receive power from a conventional power supply unit 27; this preferably is equipped with voltage regulator tubes so as to provide a regulated constant voltage supply for the various components.

A shaft actuated switch 32 is coupled mechanically to servo motor 28 to indicate the speed of motor 28 and hence pumping rate of liquid into tube 10. Actuated switch 32 connects via line 33 into a tachometer-recorder 34 of improved design which is an embodiment of our present invention and which will be described in more detail hereinafter. The speed may be recorded via pen 35 on rotating chart 36.

The above-described system, without D.C. tachometer 30, is workable over limited speed ranges. It has been found, however, that the inclusion of a velocity feedback circuit insures precise maintenance of meniscus 13 in manometer 11 and is of exceptional advantage for providing a stable servo system. Furthermore, it permits the use of a magnetic amplifier in servo drive unit 25, which has nonlinear amplification characteristics.

Turning now to FIGURE 2, at the lower left-hand portion of the drawing is a portion of the viscosimeter assembly described in detail in FIGURE 1. The balance of FIGURE 2 depicts in detail the preferred electronic circuit of the complete system which includes the circuit of our present invention.

Capacitance bridge circuit 19, which includes as an element thereof the parallel plate condenser 12 and 12a, receives radio frequency voltage through condenser 170 from an electronic oscillator circuit of preamplifier 21. The capacitance and dissipation factor balance adjustments of capacitance bridge 19 are regulated by appropriate adjustment of variable resistors 111 and 113, respectively. When employing a servo motor system, only a small motion of meniscus 13 is required to cause the servo motor to operate from zero to full rated speed.

Preamplifier 21 is a multistage electronic device including pentodes 101, 102 and 103. The plate output of tube 103 is converted from a radio frequency signal to D.C. by a circuit including crystal diode rectifier 195. Pentode tube 104 is connected as the oscillator which provides R.F. voltage to capacitance bridge 19.

The output from preamplifier 21 is sent through line 22 to servo drive unit 25. This unit preferably comprises a magnetic amplifier 196 of conventional type. A suitable magnetic amplifier is available from Magnetic Amplifiers, Inc., which is identified as model MA-61401. Magnetic amplifier 196 is driven by vaccum tubes 105 and 106; the input to tube 105 is derived from preamplifier 21. Tube 106 provides another part of the drive signal to magnetic amplifier 196 and takes its input from a D.C. tachometer 30 through lines 31a and 31b and from potentiometer 142. Potentiometer 142 is set to provide the desired meniscus position. Tachometer 30 is connected to servo motor 28 drive shaft 29 and provides, via tube 106, a negative feedback path which acts to linearize the magnetic amplifier-servo motor characteristic and fixes the control system major loop gain. With this feedback system, the overall viscosimeter has outstanding stability and accuracy.

A vacuum tube voltmeter circuit 24 is connected in circuit via line 23 with the output 22 of preamplifier 21. The reading on the dial of microammeter 197 shows the position of meniscus 13 in manometer 11.

The attached figures show the hookup between our present invention, the tachometer, and the kinematic viscosimeter which was disclosed in the allowed application S.N. 843,772, now U.S. Patent No. 3,137,161. The shaft 29 being driven by the servo motor 28 drives the pump 8 in the kinematic viscosimeter. The present tachometer is not to be confused with the simple direct current generator-type tachometer that is represented in the figures by circle 30 and is also driven by shaft 29. This other simple tachometer is included as an integral part of the pump speed servo system as a feed back transducer. One embodiment of our present invention comprises a set of four sequentially operating double-throw contacts which are mechanically actuated by shaft 29. In the FIGURES 1 and 2, as a means of simplification, only one double-throw contact and its capacitor 172 is shown. This double-throw contact is represented by the shaft actuated switch 32. The four contacts alternately complete the circuit to charge capacitors from a servo-adjustable voltage obtained from the wiper 35a of potentiometer 146 and then complete a circuit to discharge these capacitors into a filter circuit which consists of resistors 148 and 149 and capacitor 174. A portion of the voltage from this filter circuit that is obtained from across resistor 149 is continuously compared with a reference voltage, the voltage across resistor 150, that is obtained from the same supply as the aforementioned adjustable voltage. Any difference between these two voltages acts through a servo-amplifier 198 to drive a servo motor 199 that is so connected as to move the pen arm 35 of the recorder and arm 35a of the adjustable potentiometer 146. Such arrangement provides more or less charging voltage to the capacitors and, consequently, requires less or more charge per transfer to restore the voltage across resistor 149 to a value equal to the voltage across resistor 150. Arm 35a of adjustable potentiometer 146 is coupled to pen arm 35 of the tachometer-recorder 34. This recorder records a value on rotating chart 36 which is inversely proportional to the speed of shaft 29. Since the speed of shaft 29 is directly proportional to the amount of liquid pumped by pump 8, which amount is inversely proportional to the kinematic viscosity of the fluid sample being measured, the value on tachometer recorder 34 is directly proportional to the kinematic viscosity.

The faster that the servo motor 199 rotates, the greater is the number of charge transfers which occur per unit time, the smaller is the charge voltage required to transfer the same fixed amount of charge and maintain the necessary filter voltage. The position of arm 35a determines the magnitude of the voltage source, which in turn, determines the size of charge per transfer. The speed of shaft 29 determines the number of charge transfers per unit time. The tachometer servo system essentially holds the product of the number of transfers and the size of the charge per transfer fixed so that as the number of transfers increases, the charge per transfer is reduced.

Although the following is not represented in the drawing, pen arm 35 of the tachometer-recorder 34 may be connected into a control system for the purpose of regulating a process variable which determines the viscosity of the sample being measured. Many such devices are known, and operate on the principle of adjusting a process variable to restore a dependent variable, such as kinematic viscosity, to a value approaching that of a desired variable, e.g., the set point corresponding to a desired product viscosity.

The charge transferring contacts in the tachometer 34 should be rugged and durable; they must be capable of operating at the extreme ranges of servo motor 28 speed with equal precision, and should have a useful life of millions of cycles.

From the foregoing description, it is seen that an exceptionally useful instrument has been provided which can be used to aid in the rapid determination of the kinematic viscosity of a liquid. The system is relatively simple and rugged, yet accurate, dependable, and rapid in its action.

While the invention has been described in relation to specific embodiments thereof and set forth in considerable detail, it should be understood that these are by way of illustration only, and that our invention is not limited thereto. Alternative and equivalent embodiments will become apparent to those skilled in the art in view of our description of the invention. Accordingly, modifications in our invention are contemplated without departing from the spirit and broad scope thereof.

We claim:

1. A tachometer characterized by providing an output which is inversely proportional to the rotational speed of a shaft which comprises: capacitor means for storing a charge from a direct current voltage source; first contact means to complete an electrical circuit so that said direct current voltage source can charge said capacitor means, said first contact means being actuated by said shaft; a filter circuit comprising a resistance and capacitance connected in parallel; second contact means to complete an electrical circuit through which said capacitor means can be discharged into said filter circuit, said second contact means being actuated by said shaft, and said first contact means and said second contact means being actuated a number of times per unit of time interval depending upon the rotational speed of said shaft; means for comparing the direct current voltage across said filter circuit with a fixed direct current reference voltage to obtain a difference voltage; means responsive to said difference voltage and adapted to vary the voltage from said direct current voltage source in order to reduce said difference voltage to zero; and means for indicating the magnitude of the output voltage of said direct current voltage source which is the output signal from said tachometer and which is inversely proportional to the speed of said shaft.

2. The tachometer of claim 1 wherein said means responsive to said difference voltage includes a servo motor.

References Cited by the Examiner

UNITED STATES PATENTS

| | | | |
|---|---|---|---|
| 2,502,712 | 4/1950 | Floyd | 324—70 |
| 3,084,307 | 4/1963 | Landis | 317—5 |
| 3,098,970 | 7/1963 | Smith | 324—70 |

WALTER L. CARLSON, *Primary Examiner.*

FREDERICK M. STRADER, *Examiner.*

C. W. HOFFMANN, E. L. STOLARUN,
*Assistant Examiners.*